United States Patent [19]

Mitchell

[11] Patent Number: 4,473,271
[45] Date of Patent: Sep. 25, 1984

[54] METHOD AND APPARATUS FOR FIBER OPTIC COUPLING

[75] Inventor: Gordon L. Mitchell, New Brighton, Minn.

[73] Assignee: Honeywell Inc., Minneapolis, Minn.

[21] Appl. No.: 331,865

[22] Filed: Dec. 17, 1981

[51] Int. Cl.$^3$ ............................................. G02B 5/14
[52] U.S. Cl. .................................................. 350/96.15
[58] Field of Search ............... 350/96.13, 96.14, 96.15, 350/96.16; 455/610, 612

[56] References Cited

U.S. PATENT DOCUMENTS

| | | | |
|---|---|---|---|
| 3,883,222 | 5/1975 | Gunderson | 350/96.16 |
| 3,908,121 | 9/1975 | Riseberg et al. | 350/96.13 X |
| 4,054,366 | 10/1977 | Barnoski et al. | 350/96.15 |
| 4,120,560 | 10/1978 | Baues et al. | 350/96.14 |
| 4,142,775 | 3/1979 | Ramaswamy et al. | 350/96.14 |
| 4,165,225 | 8/1979 | Auracher et al. | 65/4.21 |
| 4,193,661 | 3/1980 | d'Auria et al. | 350/96.15 |
| 4,245,884 | 1/1981 | Magura et al. | 350/96.15 |
| 4,262,992 | 4/1981 | Berthold | 350/96.14 |
| 4,262,995 | 4/1981 | Tangonan | 350/96.12 |

FOREIGN PATENT DOCUMENTS 7517529  1/1976  France ............................... 350/96.15

OTHER PUBLICATIONS

Crow et al., *IBM Tech. Disc. Bull.*, vol. 23, No. 6, Nov. 1980, "Variable Optical Tap/Distributor," pp. 2590-2591.

*Primary Examiner*—John D. Lee
*Assistant Examiner*—Frank González
*Attorney, Agent, or Firm*—Charles J. Ungemach

[57] ABSTRACT

An optical coupler for use with a plurality of fiber optics to couple any signal which may appear on any one or more of the input ends of the fibers so that at least a portion of such signal appears at the output ends of such fibers.

3 Claims, 6 Drawing Figures

4,473,271

METHOD AND APPARATUS FOR FIBER OPTIC COUPLING

BACKGROUND OF THE INVENTION

In the art of optical signal handling, it is often desirable to provide a coupler which will connect a plurality of input optical fiber elements to a plurality of output optical fiber elements in such a way that all of the output fibers receive at least a portion of the optical signal which may appear on one or more of the input fibers. In the prior art, couplers for accomplishing this function were sometimes referred to as "star couplers" which either connected the input and output fibers directly with a plurality of smaller cross section fibers, such as is shown in the Leslie Gunderson U.S. Pat. No. 3,883,222 issued May 13, 1975, or which provided a mixing chamber, such as found in the d'Auria et al U.S. Pat. No. 4,193,661 issued Mar. 18, 1980, the Magura et al U.S. Pat. No. 4,245,884 issued Jan. 20, 1981 or the Tangonan U.S. Pat. No. 4,262,995 issued Apr. 21, 1981.

Star couplers are a major economic portion of a fiber optic bus. For example, in a 32 terminal bus system, the cost of electronic components is about two hundred dollars for each terminal, the cost of the fiber is about five dollars per meter while the cost of a star coupler is about four thousand dollars. With the evolution of fiber optic technology, the cost of cables, connectors and electronics is expected to decrease sharply causing considerable concern with respect to the cost of the star coupler.

SUMMARY OF THE INVENTION

The method and apparatus of the present invention provides a relatively simple and much less costly coupler for optical signals than has heretofore been available in the prior art. The invention comprises dividing the input optical fibers into pairs of fibers and joining the two fibers in each pair together, such as by fusing, to form a number of junction points at a first location. The joining of fibers along their length is a simple and inexpensive task such as is shown by the Barnoski et al U.S. Pat. No. 4,054,366 issued Oct. 18, 1977. The process of joining two fibers may be as simple as pressing them together in the presence of enough heat to melt the surface material so they become fused. For example, a pair of hot tweezers may be used to press the fibers together or the fibers may be held together and exposed to heat from another source. At any rate, coupling fibers in this manner, allows any optical signal that exists in either of the two fibers of each pair prior to the junction to be divided so that a portion of that optical signal appears on both of the fibers after the junction.

This can be extended to more than two fibers by using a number of joints described above. After the first pairs have been joined at the first location for all of the pairs, one fiber from each of the pairs is then paired with a fiber from another of the pairs and again they are fused together at a second junction located subsequent to the first junction. By this means, any optical signal which was divided at the first junction will be shared at a second junction with a fiber from a different pair and a portion of this signal then will appear at both of the new fibers subsequent to the second junction. Depending upon the number of fibers used for the input and output, a third junction, fourth junction, etc. may be employed wherein at each junction one fiber from a previous pair is joined with a fiber from a different pair so that the signal which has been divided becomes spread throughout the entire structure. As will be seen in the detailed explanation of the invention below, the number of junctions can be kept relatively small and still allow an optical signal from anyone of a plurality of input fibers to be spread out so that a portion of that signal is received at all of the output fibers.

DETAILED DESCRIPTION OF THE PREFERRED EMBODIMENT

Figure 1:
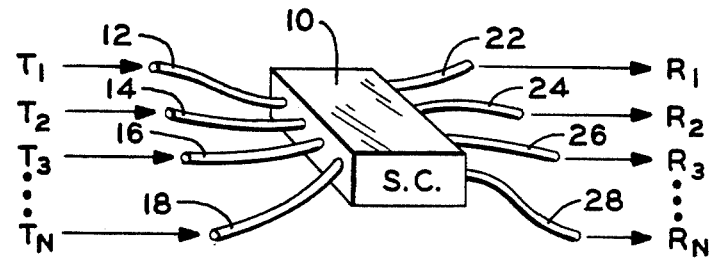
FIG. 1 shows a star coupler found in the prior art.

Referring to FIG. 1, a symbolic star coupler is shown as a box 10 labelled S.C. Star coupler 10 is shown having four input fiber optic elements 12, 14, 16 and 18 receiving inputs from transmitters $T_1$, $T_2$, $T_3$ ... $T_N$ respectively. Star coupler 10 is shown having four outputs 22, 24, 26 and 28 respectively from which four output signals to receivers $R_1$, $R_2$, $R_3$ ... $R_N$ emerge. The purpose of star coupler 10 is to take any input signal such as $T_1$ and make sure that a portion of that signal appears in each of the outputs $R_1$, $R_2$, $R_3$ ... $R_N$. Similarly, any signal $T_2$ and/or $T_3$ ... and/or $T_N$ should be split by star coupler 10 so that a portion of these outputs also appear in $R_1$, $R_2$, $R_3$ ... $R_N$. As mentioned above, the star coupler 10 has heretofore been disproportionately expensive with respect to the fiber optics and other apparatus used in such optical systems.

Figure 2:
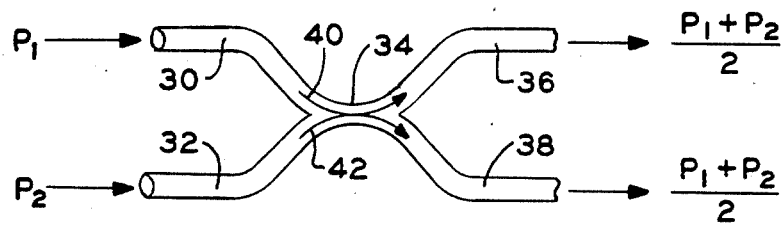
FIG. 2 shows the coupling of two fibers to form a coupling junction.

FIG. 2 shows two fiber optic elements having input portions 30 and 32, a joined together portion 34, which may be accomplished by fusing or other common techniques, and two output portions 36 and 38. An input signal $P_1$ is shown entering input portion 30 and an input signal $P_2$ is shown entering input portion 32. The two signals $P_1$ and $P_2$ are combined in the junction section 34 as shown by arrows 40 and 42 so as to produce two output signals. The output signal from both outputs is shown to be the same, i.e., $(P_1+P_2)/2$ showing that the input signals have been evenly divided and that a portion of both signals at the inputs 30 and 32 now appear at the outputs 36 and 38. In actual practice, it is not normally possible to achieve exactly a fifty-fifty division effect because of losses and coupler construction tolerances. These imperfections observed in practice do not, however, substantially alter the significant advantage of this coupler concept.

Utilizing the principles shown in FIG. 2, a fiber optic coupler may be fabricated in several ways.

Figure 3:
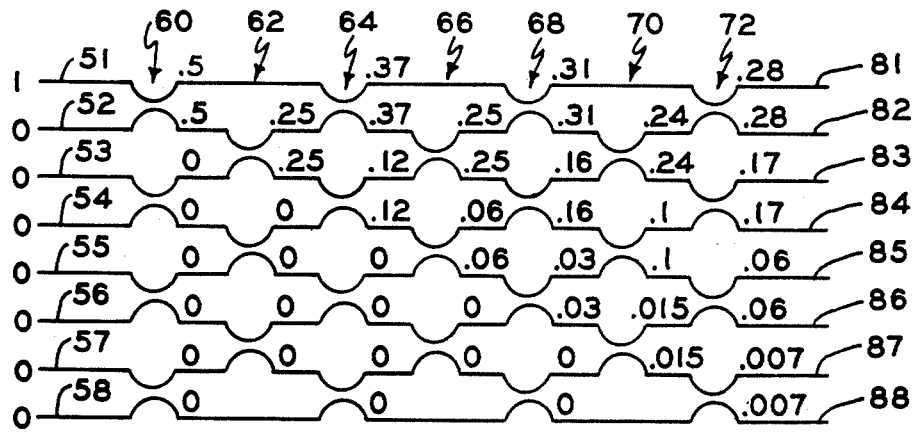
FIG. 3 is a schematic representation showing one way the coupled fibers may be joined to provide output signals which contain at least a part of one of the input signals.

FIG. 3 shows schematically a fiber optic coupler having eight individual optical fiber elements 51-58. For convenience, element 51 is shown having an input "1" while all of the other inputs are shown as "0". It will be understood, of course, that the size of the signal may be of any value and that signals may exist on any other input or on more than one of the inputs at any time.

In FIG. 3, the fiber optic elements are arranged in pairs as, for example, elements 51 and 52 comprise a pair that are joined together at a junction like that shown in FIG. 2 at a position shown as 60 in FIG. 3. Similarly, elements 53 and 54 form a pair with a junction at position 60, elements 55 and 56 form a pair with a junction at location 60 and elements 57 and 58 form a pair with a junction at location 60. Since a "1" exists on fiber optic element 51 and "0s" exist on all of the other elements, the signals on elements 51 and 52 after the junction at location 60 are shown to be 0.5 each while the signals on the rest of the elements after the junction at location 60 are shown to be 0.

Subsequent to location 60, the elements are again arranged in pairs but this time element 52 is joined with element 53 at a junction shown at location 62 in FIG. 3. Similarly, elements 54 and 55 have a junction at position 62 and elements 56 and 57 have a junction at position 62. Fiber optic elements 51 and 58 continue past position 62 with no junction.

It is seen in FIG. 3 that after the junction at position 62, element 51 will continue to have 0.5 as its signal and since 0.5 existed on element 52 prior to the junction at 62, both elements 52 and 53 will have a signal of value 0.25. The remaining elements will continue to have a 0 signal thereon.

Still further down from position 62, elements 51 and 52 are again joined at a position 64 and similarly elements 53 and 54, elements 55 and 56, and elements 57 and 58 have junctions at position 64. It is seen that after position 64, the signal on element 1 has a value of 0.37 as does the signal on element 52 while the signal on elements 53 and 54 have a value of 0.12 and the remaining elements still have a signal of value 0.

Still further down, elements 52 and 53 are again joined together at a position 66 as are elements 54 and 55 and elements 56 and 57 with elements 51 and 58 continuing past position 66. Again, by virtue of the dividing of signals, the signal on element 51 will continue to be 0.37 but the signals on elements 52 and 53 will now be 0.25 and the signals on elements 54 and 55 will now be 0.06 while elements 56, 57 and 58 continue to have a 0.

This continues in a similar fashion to position 68 where elements 51 and 52, elements 53 and 54, elements 55 and 56 and elements 57 and 58 are again joined after which it is noted that the value of the signal on elements 51 and 52 is now 0.31, the value on elements 53 and 54 is now 0.16, the value of the signal on elements 55 and 56 is now 0.03 and elements 57 and 58 are still 0.

At the next position 70 in FIG. 3, elements 52 and 53, elements 54 and 55, and elements 56 and 57 are again joined with elements 51 and 58 passing by position 70 without a junction. It will be noted that after position 70, element 51 has a signal of value 0.31, elements 52 and 53 have a signal of value 0.24, elements 54 and 55 have a signal of value 0.1, elements 56 and 57 have a signal of value 0.015 and element 58 continues to have a 0 signal.

The final junction is shown at a position 72 where elements 51 and 52, elements 53 and 54, elements 55 and 56, and elements 57 and 58 are again joined and it is now seen that the original 1 appearing on element 51 has been spread throughout the entire structure so that at least a portion of that signal appears on all of the output ends 81-88 of the fiber optic elements 51-58 respectively. Elements 51 and 52 now have a signal of value 0.28, elements 53 and 54 now have a signal of value 0.17, elements 55 and 56 now have a signal of value 0.06 and elements 57 and 58 now have a value of 0.007. Thus, the input signal has been spread throughout all of the fibers by use of the repeated junctions between pairs of fiber optic elements.

The apparatus of FIG. 3 has several undesirable features: first, a fairly large number of junctions are required (25) when eight fibers are used and second, the outputs 81-88 differ in magnitude from a value of 0.28 to a value of 0.007. When larger number of fibers are used, the number of junctions increases considerably and the size of the smaller signals becomes very small. The actual number of junctions is given by the formula $J_P = N^2/2 - N + 1$ where $J_P$ is the number of junctions and $N$ is the number of fibers used in the system. The structure of FIG. 3 may be referred to as a planar coupler and, referring to FIG. 5 which shows the number of junctions compared with the number of fibers, it is seen that the curve identified by reference numberal 90 compares the number of fibers and the number of joints for a planar coupler.

Figure 4:
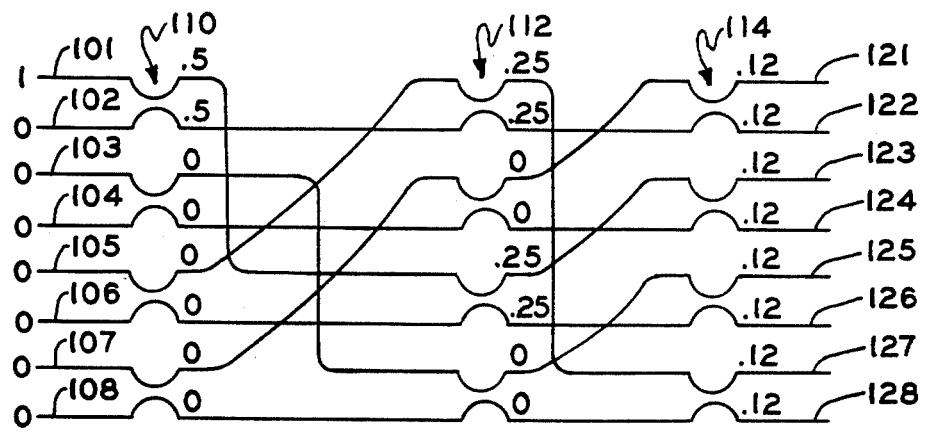
FIG. 4 is a preferred embodiment of the present invention in which the number of couplings has been considerably reduced over that shown in FIG. 3 and wherein the final output is a more uniform representation of the input than was the case in FIG. 3.

To overcome the deficiencies of FIG. 3, a preferred embodiment of the present invention proposes a coupling arrangement such as is shown schematically in FIG. 4.

FIG. 4 again shows eight fiber optic elements, 101-108, respectively and, like in FIG. 3, an input signal of value 1 is shown at the input of element 101 while the remaining elements have an input signal of value 0. Again in FIG. 4, the elements are gathered together in pairs with 101 being paired with 102, 103 being paired with 104, 105 being paired with 106, and 107 paired with 108 and then the pairs are joined at a first location 110 in a manner similar to that shown in FIG. 3. As was the case in FIG. 3, the magnitude of the signals existing after the junctions at position 110 is again 0.5 for elements 101 and 102 and 0 for the remaining elements.

After the junctions at position 110, the elements are again paired but in a manner substantially different from that shown in FIG. 3. As shown in FIG. 4, element 101 is paired with element 106, element 103 is paired with element 108, element 105 is paired with element 102 and element 107 is paired with element 104. After this pairing arrangement, the pairs are again joined at a position 112. By this arrangement, four elements, 105, 102, 101 and 106 have a signal of value 0.25 after the junction at position 112 while elements 107, 104, 103 and 108 continue to have a 0 signal.

After the junction at position 112, the elements are again paired and the pairs are joined together at a position 114. It is seen in FIG. 4 that element 107 is now joined with element 102, element 101 is now joined with element 104, element 103 is now joined with element 106 and element 105 is now joined with element 108. After the junctions at position 114, there exists output portions 121-128 and all of the outputs have a signal of value equal to 0.12. It is also noted that a number of junctions used in FIG. 4 is 12 which is less than half the number used in FIG. 3. The actual number of junctions used with any number of fibers is given by the expression $J_N = N/2\log_2 N$. Thus, by arranging the junctions as shown in FIG. 4, a uniform output is obtained and a far smaller number of junctions is required.

Figure 5:
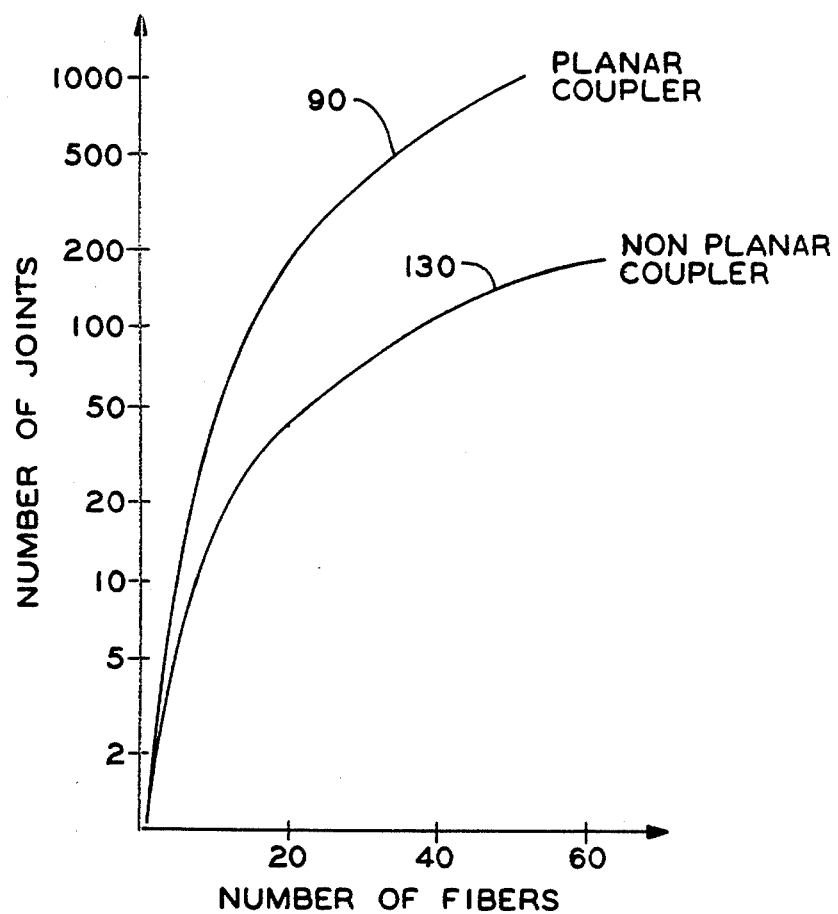
FIG. 5 is a graph showing a comparison between the number of joints required with respect to the planar coupler of FIG. 3 and the number of joints required with the nonplanar coupler of FIG. 4 for increasing numbers of fibers utilized.

The apparatus of FIG. 4 may be referred to as a nonplanar coupler since it requires a cross over of fiber optic elements in various locations throughout the system. FIG. 5 shows the comparison of the number of joints required versus the number of fibers used for the nonplanar coupler along a curve identified by reference numeral 130. It is seen that as the number of fibers increases, the difference between the number of joints used for the nonplanar coupler becomes more and more significant with respect to the number of joints used with respect to the planar coupler.

Figure 6:
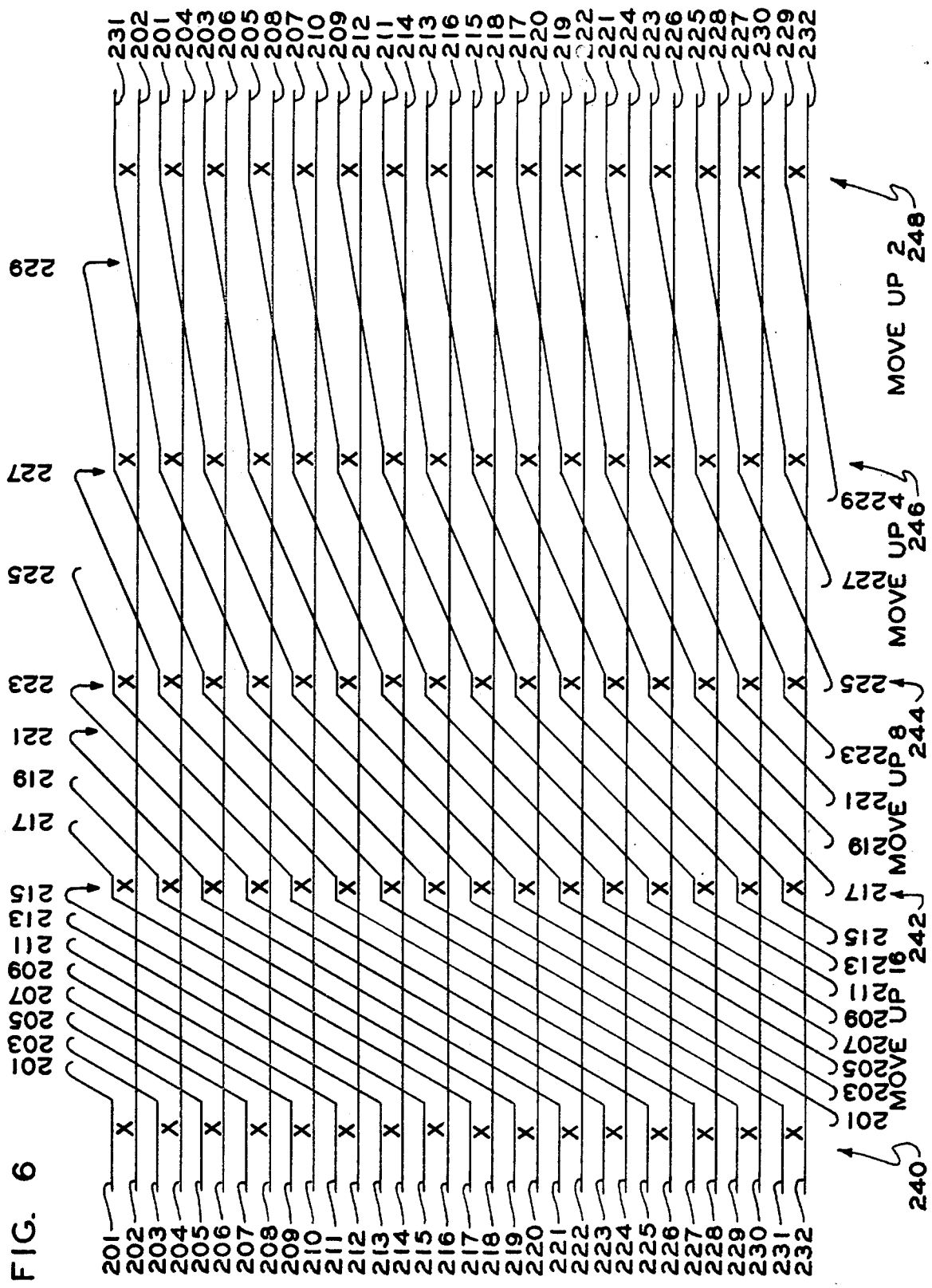
FIG. 6 shows a schematic representation of a fiber optic coupler employing 32 input and output fibers.

While FIG. 4 is shown to have eight fiber optic elements, the principles in the connections of joints with respect to various pairs can be applied to any number of elements. FIG. 6 shows a 32 element system and the procedure by which they are joined in pairs and coupled. In FIG. 6, the 32 fiber optic elements are identified by lines 201-232. For simplicity in FIG. 6, an X has been placed between any two fiber optic elements that are coupled together and it is therefore seen that elements 201 and 202 as well as elements 203 and 204, elements 205 and 206 . . . elements 231 and 232 are coupled at a first position 240. Element 201 then is shown leading upwards and hooking downwardly to indicate that it traverses all of the other fiber optic elements and appears again at the bottom as element 201 and from thence upwardly at an angle where it is shown being paired with element 218. Element 203 in similar fashion is shown leading up to the right where it hooks downwardly and appears again at the bottom and then leads upward to the right where it is paired with element 220. Likewise, elements 205, 207, 209, 211, 213 and 215 are shown moving up to the right hooking down, appearing at the bottom and moving up to the right to be paired with elements 222, 224, 226, 228, 230 and 232 respectively. Elements 217, 219, 221, 223, 225, 227, 229 and 231 are shown moving up to the right to be paired with elements 202, 204, 206, 208, 210, 212, 214 and 216 respectively. As can be seen, each of the elements in effect moves up 16 positions after the junctures at position 240 to be paired with a new element. After being so paired, the elements are again joined at a position shown as 242. After the signals are combined at position 242, all of the elements now move up eight positions in FIG. 6 where they are again paired with a new element and then coupled at a position shown as 244. After the signals are combined at position 244, the elements again move up but this time four positions to form new pairings and junctures at position 246 after which time the elements move up two positions to form a final pairing and juncture at position 248. The right-hand end of FIG. 6 shows the arrangement of the various elements 201-232 after the pairings and junctures. In general, one convenient way of establishing which elements should be paired with which elements, it is seen that by taking the number of elements and dividing by two and then moving each odd numbered element up by that number to form the new pairing and then after the new pairing taking the number of elements dividing by four and moving each odd numbered element up by that amount and after the second pairing moving each odd numbered element up by the number of elements divided by eight, etc., until a position is reached where each odd numbered element only moves upward two at which time there will be a coupling of the signals which may exist on anyone of the input elements to all of the output elements.

The described coupling arrangement is completely satisfactory if the number of fiber optic elements is equal to a power of 2. If the number of elements is other than a power of 2, then at some locations certain fibers will not be paired and the final output signal on all of the fibers will not be exactly equal. At worst, the ratio between the brightest output and the dimmest will be a factor of two. This is considerably better than the factor of 0.28/0.007 = 40 achieved by the planar coupler of FIG. 3. This is satisfactory for most requirements but if not, extra fibers may be added to the coupler to make a power of 2 and then the extras will not be used or can act as spares if other fibers fail.

The procedure for coupling described above is not critical. After each junction, the next pairing should be to combine a fiber which has a signal with one which does not so as to maximize the sharing and minimize the joints.

It is thus seen that I have provided a coupling arrangement by which signals on any one of a number of input elements can be transferred and divided so as to provide, at the output of said elements, at least a portion of the signal at each of the inputs. Many obvious alterations and modifications to the structure shown herein will occur to those skilled in the art. I therefore do not wish to be limited by the specific disclosures used in connection with the preferred embodiments but wish only to be limited by the following claims.

The embodiments of the invention is which an exclusive property or right is claimed are defined as follows:

1. The method of dividing optical signals which may appear on any of a plurality of optical fibers so that a portion of each such signal appears at an output end portion of all of the plurality comprising the steps of:
   A. separating the plurality into a first plurality of pairs of optical fibers and joining each pair together at a first location so that any optical signal appearing on either optical fiber prior to the first location is divided and a portion of such optical signal appears on each optical fiber after the first location;
   B. separating the fibers after the first location into a second plurality of pairs of optical fibers in which each of the second pairs consist of two fibers from different ones of the first pairs so that any optical signal appearing on either optical fiber prior to the second location is divided and a portion of such optical signal appears in both optical fibers after the second location; and
   C. repeating step B for third and subsequent locations until all of the fibers in the plurality receive a portion of any signal on any optical fiber prior to the first location.

2. Apparatus for use in a system for dividing an optical signal which may appear on any one of a plurality of fiber optic elements so that a portion of such signal appears at the output end portions of all of the plurality of fiber optic elements comprising:
   a first coupling junction between a first pair of the plurality of fiber optic elements to divide any signal appearing on either element of the first pair so that, thereafter, a portion of the signal appears on both elements of the first pair;
   a second coupling junction between a second pair of the plurality of fiber optic elements to divide any signal appearing on either element of the second pair so that, thereafter, a portion of the signal appears on both elements of the second pair;

a third coupling junction between a first element of the first pair and a first element of the second pair, the third coupling junction positioned after the first and second coupling junctions so that, thereafter, a portion of any signal appearing on either one of the first elements of the first and second pair appears on both of such first elements;

a fourth coupling junction between a third pair of the plurality of fiber optic elements to divide any signal appearing on either elements of the third pair so that, thereafter, a portion of the signal appears on both elements of the third pair;

a fifth coupling junction between a fourth pair of the plurality of fiber optic elements to divide any signal appearing on either element of the fourth pair so that, thereafter, a portion of the signal appears on both elements of the fourth pair;

a sixth coupling junction between a first element of the third pair and a first element of the fourth pair, the sixth coupling junction positioned after the fourth and fifth coupling junctions so that, thereafter, a portion of any signal appearing on either one of the first elements of the third and fourth pair appears on both of such first elements; and a seventh coupling junction between a first element chosen from the first and second pair and a first element chosen from the third and fourth pair, the seventh coupling junction positioned after the third and sixth coupling junctions so that, thereafter, a portion of any signal appearing on either one of the chosen first elements appears on both of such first elements.

3. An optical coupler comprising:

a plurality of optical fibers having input portions and output portions; and means connecting the input portions to the output portions in a manner such that a portion of any signal appearing on any one of the input portions appears on each of the output portions, the means comprising a plurality of junctions between pairs of such fibers, each junction consisting of only two fibers and each junction connecting a different pair of said fibers with no two fibers being joined twice so that a path exists from each input fiber to all output fibers.

* * * * *